D. H. DUGAR.
EXPANSIBLE REAMER.
APPLICATION FILED OCT. 23, 1917.
1,299,563.
Patented Apr. 8, 1919.
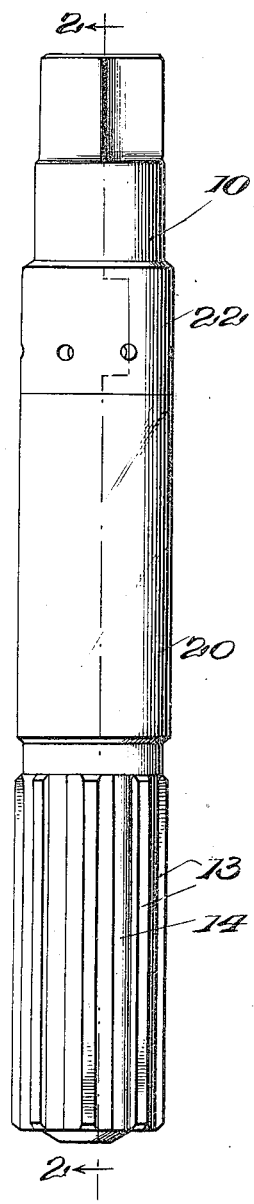
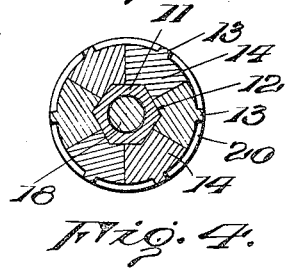
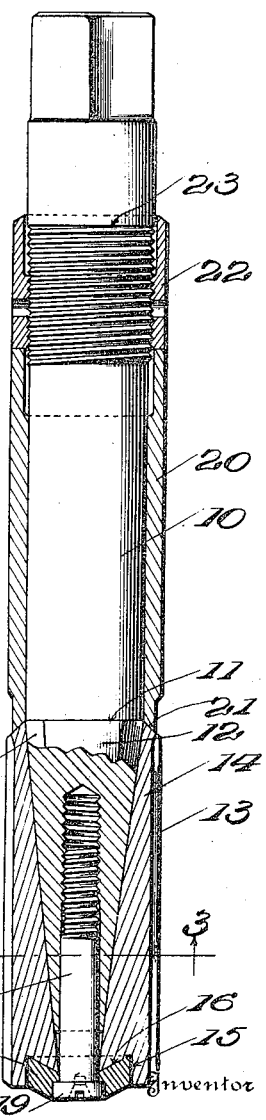
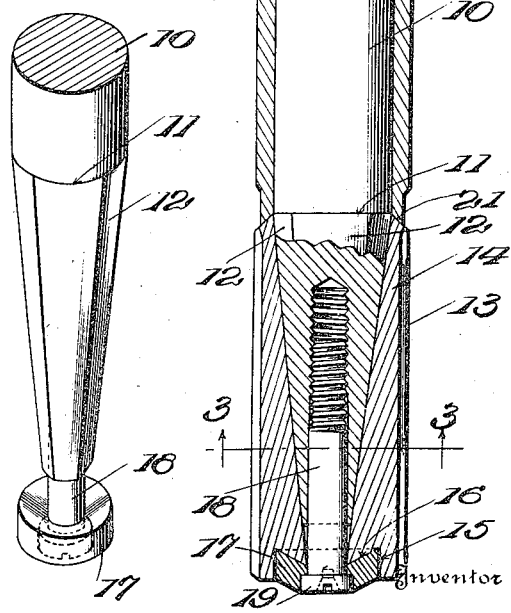
Inventor
D. H. Dugar.
By
Attorneys.

UNITED STATES PATENT OFFICE.

DELANO H. DUGAR, OF ELYRIA, OHIO.

EXPANSIBLE REAMER.

1,299,563.   Specification of Letters Patent.   Patented Apr. 8, 1919.

Application filed October 23, 1917. Serial No. 198,126.

*To all whom it may concern:*

Be it known that I, DELANO H. DUGAR, a citizen of the United States, residing at Elyria, in the county of Lorain and State of Ohio, have invented certain new and useful Improvements in Expansible Reamers, of which the following is a specification.

This invention relates to an improved expansible reamer and has as its primary object to provide a device of this character wherein the cutting blades of the reamer may be adjusted with extreme accuracy.

The invention has as a further object to provide a reamer embodying an exceedingly simple adjusting means for the cutting blades.

And the invention has as a still further object to provide a construction employing a centering disk forming a slidable connection between the blade adjusting means and the blades so that the said adjusting means will act equally upon all of the blades without any cramping action between the blades and wherein the said centering means will also act to hold the outer extremities of the blades against the body of the reamer.

Other and incidental objects will appear as the description proceeds and in the drawings wherein I have illustrated the preferred embodiment of the invention and wherein similar reference characters designate corresponding parts throughout the several views:

Figure 1 is a side elevation of my improved reamer showing the arrangement of the cutting blades at the outer extremity of the reamer body, Fig. 2 is a vertical sectional view particularly illustrating the mounting of the cutting blades as well as the means for adjusting the said blades, Fig. 3 is a transverse sectional view taken on the line 3—3 of Fig. 2 and looking in the direction of the arrows, this view particularly showing the manner in which the cutting blades are formed to engage the angular inclined blade seats of the reamer, and Fig. 4 is a fragmentary elevation showing the lower extremity of the reamer body and the inclined blade seats formed thereon as well as the adjusting screw for the cutting blades and centering disk carried by the said screw.

In carrying out the invention, my improved reamer is formed with a cylindrical body 10 provided with a longitudinally tapered outer extremity 11, while the inner terminal of the said body is squared to receive a hand tool for manually operating the reamer or to receive a lathe collet. The tapered extremity 11 of the body 10 is preferably hexagonal in cross section to provide a plurality of inclined angular blade seats 12, the angles of these seats being formed by the junction of the flat faces of the said tapered portion.

Slidably mounted upon the blade seats 12 to surround the body 10 are a plurality of cutting blades 13. Each of these blades is formed with a body 14 provided upon its inner side, as particularly shown in Fig. 3 of the drawings, with angularly disposed faces engaging the angular faces of one of the blade seats 12 for holding the blade against rotation with respect to the reamer body. The bodies 14 of the blades are, as shown in detail in Fig. 2, substantially wedge-shaped to support the blades parallel to the axis of the body and at their lower extremities are formed with inwardly inclined notches 15 opening through the inner side and bottom edges of the blade bodies. The bottom edges of these notches therefore provide shoulders 16 sloping outwardly with respect to the reamer body toward the axis thereof. Loosely mounted within the notches 15 is a centering disk 17 having an inner concave face snugly fitting against the shoulders 16 of the said notches and rotatably fitted through this disk is an adjusting screw 18. The screw 18 is removably received within a suitable axial bore in the outer extremity of the body 10 and since the taper of the extremity 11 of the reamer body materially reduces the thickness of the wall surrounding the said bore at its outer extremity, the said bore is formed at its inner extremity only with a screw thread to engage the threaded inner extremity of the said screw. At its outer end, the screw 18 is formed with an annular head 19 notched to receive an adjusting tool and countersunk in the outer convex face of the disk 17. As will now be clear, the disk 17 will therefore be supported to connect the blades at their outer extremities.

Adjustably fitted upon the body 10 at the inner extremities of the cutting blades 13 is a blade holding sleeve 20. The outer end of this sleeve is formed with an inwardly under-cut or beveled edge 21 engaging over the upper terminals of the blade bodies 14 which are suitably beveled to fit beneath the said edge. The sleeve 20 will therefore serve to connect the blades at their inner extremities. Threaded upon the body 10 to engage the inner terminal of the sleeve 20 is a locking sleeve 22, the inner terminal of which is, as particularly shown in Fig. 2, counterbored to snugly surround a shoulder 23 upon the body for housing and protecting the thread thereof. By adjusting the locking sleeve, the sleeve 20 may be tightly clamped against the cutting blades for binding the said blades at their inner extremities against the reamer body. At the same time, the screw 18 may be adjusted to clamp the disk 17 against the shoulders 16 of the blade bodies for binding the outer extremities of the blades against the reamer body. The blades will thus be firmly held in position between the said disk and sleeve to be rigidly supported against inward radial movement by the body of the reamer.

As will now be understood, the locking sleeve 22 may be released when the screw 18 may then be adjusted for shifting the cutting blades upwardly upon the inclined blade seats 12 and adjusting the said blades outwardly upon the reamer body. This provides a very simple and effective adjusting means for the said blades while the locking sleeve 22 may then again be quickly positioned for holding the blades at adjustment. In this connection, attention is directed to the fact that when the screw 18 is tightened, the shoulders 16 of the cutting blades will ride upon the concave face of the disk 17 for centering the blades with respect to the blade seats and tightly binding the blades in engagement with the said seats without cramping the blades with respect to each other. This feature of the present invention therefore constitutes a highly desirable arrangement since by employing the disk 17, the blades may be adjusted with extreme accuracy to be tightly clamped in adjusted position.

It will therefore be seen that I provide a particularly efficient construction for the purpose set forth and a reamer which, while being of a very simple nature, is, nevertheless, adapted for accurate finishing work.

Having thus described the invention, what is claimed as new is:

1. In a reamer, the combination of a body formed with a longitudinally tapered portion having its peripheral surface formed with a plurality of angular faces providing inclined blade seats, abutting cutting blades fitting around said tapered portion of the body and engaging throughout their length with said seats to be held upon the body for rotation therewith, means adjustable upon the body and clamping the inner ends of the blades about the blade seats, centering means engaging the outer ends of said blades, and means adjustable axially of the smaller end of the tapered portion of the body and coacting with said centering means for clamping the outer ends of the blades about the blade seats, said first and last mentioned means being operable for adjusting the blades longitudinally of said seats.

2. In a reamer, the combination of a body formed with a longitudinally tapered portion having its peripheral surface provided with a plurality of inclined blade seats each formed with meeting angular faces, cutting blades disposed around the tapered portion of the body and fitting the meeting angular faces of the blade seats to be held thereby upon the body for rotation therewith, means adjustable upon the body and clamping the inner ends of the blades about the blade seats, and means adjustable axially of the smaller end of the tapered portion of the body and clamping the outer ends of the blades about the blade seats, said first and last mentioned means being operable for adjusting the blades longitudinally of the seats.

In testimony whereof I affix my signature.

DELANO H. DUGAR. [L. S.]